Patented June 18, 1935

2,004,970

UNITED STATES PATENT OFFICE 2,004,970

MANUFACTURE OF UREA-FORMALDEHYDE CONDENSATION PRODUCTS AND ARTIFICIAL MATERIAL THEREFROM

René Armenault, Paris, France, assignor of one-half to Fabriques de Produits de Chimie Organique de Laire, Societe Anonyme, Issy, France, a company of France No Drawing. Application February 18, 1932, Serial No. 593,925. In France February 23, 1931

2 Claims. (Cl. 260—3)

In making urea-formaldehyde resins which are intended to be moulded at a raised temperature and under pressure, either alone or in combination with a filling agent, it is desirable to obtain products which are very plastic and liquefy readily under the influence of heat. It has been found that, without modifying the proportions or the general operating method described in the U. S. patent application Ser. No. 411,212 filed December 2, 1929, it is possible to vary at will the plasticity of the materials which are to be moulded, this plasticity being dependent upon the degree of polymerization of the condensation products.

In particular, in the case of the condensation products prepared in the presence of a metallic carbonate or oxide, for example, those prepared in the presence of zinc, lead, or bismuth oxide or carbonate, it has been observed that the degree of polymerization is above all a function of the temperature at which the condensation is conducted and that, the duration of the heating being the same, products made at the temperature of the water bath are more plastic than those which are made at the boiling point of the solution of urea in formaldehyde.

As a result of investigations based on the foregoing observation, it has been found that better conditions for the production of plastic masses which can easily be moulded are realized when the condensation occurs at ordinary temperature in the presence of a metallic carbonate or oxide.

When operating at ordinary temperature the favourable action of the metallic carbonate or oxide is evidenced by the fact that after a certain time of contact (which may be as long as may be desired, but for which several hours will suffice) the pH value of the reaction solution becomes adjusted to a value which when the solution is kept at ordinary temperature may remain constant for some weeks, even after the excess of the metallic reagent has been removed by filtration.

It is to be noted that whilst this pH value is fixed for a given metal oxide or carbonate, it varies according to the metal of the group under consideration.

It has also been found that the preparation of the dimethylol compounds in a feebly acid medium does not present difficulty under these conditions and that these compounds have, even in the presence of an excess of formaldehyde, a stability such that they can be left without detriment at ordinary temperature for several weeks or even for a longer period, after which they may be converted, in the manner hereinafter indicated, into masses capable of being moulded.

When the diemthylol compounds made under the aforesaid conditions are allowed to stand until they have solidified, they have the appearance of a greasy crystalline mass which, like a wax or paraffin, can be melted by mere heating on the water bath.

When it is desired to prepare a powder without addition of a filling agent, this crystalline mass may first be dried by exposure to air in order to remove adherent liquid, then suitably sub-divided and dried at a moderately raised temperature; there is thus produced a moulding powder which will yield, when subjected to a suitable temperature and pressure in presence of an acid condensing agent, objects which may be translucent or even transparent.

When it is desired to produce a powder containing a filling agent, the aforesaid crystalline mass may be melted on the water bath and the melt used for impregnating various filling agents, such as cellulose, hydrocellulose, powdered horn, casein, asbestos fibres or asbestos powder or the like, or mixtures of any of these agents, with or without coloured mineral filling agents. The impregnated filling agents are dried at a low temperature and ground; during the grinding operation there may be added a substance capable of accelerating the polymerization at the moulding temperature, such as an acid, an acid salt, or a salt or ester-salt capable of liberating acid. It is also possible to add these substances to the molten product before the impregnation of the filling agents. In the production of moulding powders containing filling agents it is often more advantageous to impregnate the filling agents not with the dimethylol syrups, but with freshly prepared, reactive solutions of urea and formaldehyde whose pH value has been adjusted by treatment with a metal carbonate or oxide which has afterwards been separated by filtration. Under these conditions the condensation reaction occurs in the midst of the filling agent, so that the operations of mixing or of fusing the dimethylol products are avoided and complete homogeneity is ensured. After standing for about 36-48 hours, which period may be reduced if crystallization is initiated by means, for example, of some crystals or portions from a preceding operation, it suffices to dry the impregnated filling agents at a low temperature, if desired after they have been air-dried, and then to grind them, in order to obtain, as in the process previously described, stable materials of high plasticity which are well suited for being moulded with the aid of pressure and heat, whether by compression or by injection. Moulded articles made from the powders thus obtained are less coloured and of a higher resistance to breakage than those moulded from a powder made from a syrup produced at a raised temperature.

If it is desired to prepare from the crystalline mass above described condensation products having a higher degree of polymerization and in consequence possessing particular properties, it suffices to subject them to the action of heat, the degree of polymerization being then a function of the temperature or, for a given temperature, of the duration of heating.

The products, thus obtained have the appearance of stable syrups. They may be converted into moulding materials by using them to impregnate various filling agents, such as cellulose, hydrocellulose, horn and so on. They may also serve, after they have been concentrated for the preparation of varnishes or of transparent or opaque masses which, when hardened in known manner, are capable of being worked. Advantage may be taken of the intermediate stage which precedes the final hardening and may be prolonged at will by control of the pH value or the temperature, to sub-divide the products by suitable mechanical means and to convert them into plates or various shaped masses or into the powders which are capable of being again agglomerated by the action of pressure and heat.

The following examples illustrate the invention, the parts being by weight:

*Example 1.*—4 parts of precipitated zinc carbonate are added to a solution of 100 parts of urea in 400 parts of formaldehyde of 30 per cent. strength. After the whole has been stirred for 15-30 minutes, it can be ascertained that the pH value of the solution has become adjusted to a value in the neighbourhood of pH=6. The excess of zinc carbonate is removed by filtration and the solution is allowed to stand at ordinary temperature; after 24-36 hours, the formation of a crystalline product can be observed and finally the solution sets to a white greasy mass resembling a wax or paraffin. Crystallization may be promoted by stirring or by seeding with crystals from a previous operation and it is possible to avoid the rise in temperature which might occur during crystallization.

When the crystalline mass is reheated on the water bath to a moderate temperature, it quickly becomes liquid; it may be used directly or there may be added to it one part of crystallized ammonium acetate which produces an acid reaction.

The syrup may be used to impregnate, for example, 100 parts of cellulose, hydrocellulose or the like; the impregnated mass is dried in a current of air at a low temperature, that is to say at a temperature which is not allowed to exceed 50-60° C., and is finally ground.

During the grinding there may be added a substance which promotes the polymerization, for example 0,5 per cent. of benzoic acid, or a coloring matter, a plasticizer, a stearate or the like.

*Example 2.*—In the preceding example the proportion of formaldehyde may be reduced to 100 parts of formaldehyde ($CH_2O$) for 100 parts of urea without appreciable modification of the general procedure. The relative proportions of the condensation product and the filling agent may be varied within wide limits in accordance with the properties required of the final products.

*Example 3.*—The crystalline methylol product of low melting point may be dried after a preliminary drying by exposure to air. After the addition of an acid, an acid salt or an acid ester capable of promoting the polymerization, it yields unfilled powders from which there can be obtained by moulding at a raised temperature materials which are translucent or completely transparent.

*Example 4.*—In Examples 1 and 2, the filling agent be impregnated directly with the mixture of urea and formaldehyde immediately after its treatment with the metal carbonate selected and removal of the excess of the latter by filtration; the solution may be regarded rather as a solution of substances which are undergoing reaction than as a syrup of previously formed dimethylol compounds. The impregnated filling material is allowed to stand at ordinary temperature for 36-48 hours; it is then dried by exposure to air, if necessary, and then dried at a moderate temperature and ground.

*Example 5.*—The syrup obtained by heating the crystalline mass for a shorter or longer period is concentrated to about half its initial weight and is then allowed to stand at a low temperature, with or without the addition of a plasticizing agent such as ethyl alcohol, benzyl alcohol, triacetin or the like, until it has solidified. The mass is then mechanically subdivided, dried at a low temperature and ground. The powder thus prepared can be moulded by compression at a raised temperature and yields transparent products.

*Example 6.*—The syrup obtained in the manner indicated in Example 5 and, if necessary, concentrated, may serve for impregnating a filling agent such as cellulose, horn, hydrocellulose or the like. After drying and grinding, the mass may be moulded with the aid of pressure and heat to produce translucent products whose colour will vary according to that of the filling material.

*Example 7.*—The syrup obtained by polymerization of the crystalline mass under the influence of heat yields, when concentrated, a material having a good stability and suitable as a varnish base. It may be mixed with various solvents capable of modifying its properties, for example ethyl alcohol, methyl alcohol, benzyl alcohol and the like, whereby the scope of its application is extended.

The same syrup when concentrated and cast in moulds of various shapes yields on heating at a temperature of 50-60° C. hard masses which are completely transparent and can be carved and worked with the usual tools.

What I claim is:

1. Method of producing a moldable powder which comprises agitating approximately 4 parts of precipitated zinc carbonate in an aqueous mixture of 100 parts of urea and 100–120 parts of formaldehyde, removing the undissolved zinc carbonate, allowing the reaction mixture to stand at room temperature for 24–36 hours to obtain a greasy, crystalline mass, drying said mass, and comminuting same to give a moldable powder.

2. Method of producing a moldable powder which comprises agitating approximately 4 parts of precipitated zinc carbonate in an aqueous mixture of 100 parts of urea and 100–120 parts of formaldehyde, removing the undissolved zinc carbonate, allowing the reaction mixture to stand at room temperature for 24–36 hours to obtain a greasy, crystalline mass, melting said mass, mixing the resulting liquid with a filler, drying the mixture obtained, and comminuting same to give a moldable powder.

RENÉ ARMENAULT.